(12) United States Patent
Grosinger et al.

(10) Patent No.: US 8,917,202 B2
(45) Date of Patent: Dec. 23, 2014

(54) BACKSCATTER RFID SENSOR WITH A BEND TRANSDUCER

(75) Inventors: Jasmin Grosinger, Vienna (AT); Joshua D. Griffin, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 318 days.

(21) Appl. No.: 13/586,401

(22) Filed: Aug. 15, 2012

(65) Prior Publication Data

US 2014/0049421 A1    Feb. 20, 2014

(51) Int. Cl.
*G01S 13/08* (2006.01)

(52) U.S. Cl.
USPC .......................................... 342/42; 340/425.1

(58) Field of Classification Search
USPC ............................ 342/42–51, 146; 340/425.1
See application file for complete search history.

(56) References Cited

U.S. PATENT DOCUMENTS

| | | | |
|---|---|---|---|
| 5,086,785 A | 2/1992 | Gentile et al. | |
| 2004/0135675 A1* | 7/2004 | Thiesen et al. | 340/10.1 |
| 2006/0181421 A1* | 8/2006 | Forcier et al. | 340/572.1 |
| 2011/0003279 A1* | 1/2011 | Patel | 435/5 |
| 2012/0075072 A1* | 3/2012 | Pappu | 340/10.1 |

OTHER PUBLICATIONS

Mandel, C.; Schussler, M.; Jakoby, R.; , "A wireless passive strain sensor," Sensors, 2011 IEEE , vol., No., pp. 207-210, Oct. 28-31, 2011.

So, J.-H., Thelen, J., Qusba, A., Hayes, G. J., Lazzi, G. and Dickey, M. D. (2009), Reversibly Deformable and Mechanically Tunable Fluidic Antennas. Adv. Funct. Mater., 19: 3632-3637. doi: 10.1002/adfm. 200900604.

Mazlouman, S.J.; Xing Jie Jiang; Mahanfar, A.; Menon, C.; Vaughan, R.G.; , "A Reconfigurable Patch Antenna Using Liquid Metal Embedded in a Silicone Substrate," Antennas and Propagation, IEEE Transactions on , vol. 59, No. 12, pp. 4406-4412, Dec. 2011.

Khan, Mohammad Rashed ; Hayes, Gerard J. ; So, Ju-Hee ; et al., A frequency shifting liquid metal antenna with pressure responsiveness, Applied Physics Letters vol. 99 Issue: 1 Article No. 013501, Jul. 4, 2011.

Dickey, M. D., Chiechi, R. C., Larsen, R. J., Weiss, E. A., Weitz, D. A. and Whitesides, G. M. (2008), Eutectic Gallium-Indium (EGaln): A Liquid Metal Alloy for the Formation of Stable Structures in Microchannels at Room Temperature. Adv. Funct. Mater., 18: 1097-1104.

(Continued)

*Primary Examiner* — Timothy A Brainard
(74) *Attorney, Agent, or Firm* — Marsh Fischmann & Breyfogle LLP; Kent A. Lembke

(57) ABSTRACT

A bend sensor for use in wirelessly sensing an amount of bend of a joint or other monitored object. The sensor includes a radio frequency (RF) antenna and an integrated circuit linked to the antenna. The integrated circuit or chip is passive and responds to, or is powered by, a read signal received by the antenna to transmit a reflected signal via the antenna such as to an RFID reader. The sensor also includes a transducer linked to the integrated circuit. The transducer defines reflecting impedance, which modulates amplitude and phase of the reflected signal. The transducer has impedance varying with deformation or bend. In one example, the transducer includes an upper conductor, and the amount of the deformation is defined by a bend radius of the upper conductor. The read signal may be at 5 GHz or higher such with the antenna and the transducer being microwave structures.

22 Claims, 6 Drawing Sheets

(56) References Cited

OTHER PUBLICATIONS

Kornek, D.; Slottke, E.; Orlob, C.; Rolfes, I.; , "Experimental investigation of bent patch antennas on MID substrate," Antennas and Propagation (EuCAP), 2010 Proceedings of the Fourth European Conference on , vol., No., pp. 1-3, Apr. 12-16, 2010.
Berthold, J.W.; , "Historical review of microbend fiber-optic sensors," Lightwave Technology, Journal of , vol. 13, No. 7, pp. 1193-1199, Jul. 1995.
Tognetti, A.; Carbonaro, N.; Zupone, G.; De Rossi, D.; , "Characterization of a Novel Data Glove Based on Textile Integrated Sensors," Engineering in Medicine and Biology Society, 2006. EMBS '06. 28th Annual International Conference of the IEEE , vol., No., pp. 2510-2513, Aug. 30, 2006-Sep. 3, 2006.
Sam Wise, MD; William Gardner ; Eric Sabelman, PhD ; Erik Valainis; Yuriko Wong, OTR; Karen Glass, OTR ; John Drace, MD ; Joseph M. Rosen, MD, Evaluation of a fiber optic glove for semi-automated goniometric measurements, Journal of Rehabilitation Research and Development vol. 27 No. 4, 1990, pp. 411-424.
Reinhard Gentner, Joseph Classen, Development and evaluation of a low-cost sensor glove for assessment of human finger movements in neurophysiological settings, Journal of Neuroscience Methods, vol. 178, Issue 1, Mar. 30, 2009, pp. 138-147.
Bhattacharyya, R.; Floerkemeier, C.; Sarma, S.; , "Low-Cost, Ubiquitous RFID-Tag-Antenna-Based Sensing," Proceedings of the IEEE, vol. 98, No. 9, pp. 1593-1600, Sep. 2010.
Sari Merilampi, Toni Björninen, Leena Ukkonen, Pekka Ruuskanen, Lauri Sydänheimo, (2011) "Embedded wireless strain sensors based on printed RFID tag", Sensor Review, vol. 31 Iss: 1, pp. 32-40.
Bhattacharyya, R.; Floerkemeier, C.; Sarma, S.; , "Towards tag antenna based sensing—An RFID displacement sensor," RFID, 2009 IEEE International Conference on , vol., No., pp. 95-102, Apr. 27-28, 2009.
Yi Jia et al., Design and characterization of a passive wireless strain sensor, 2006 Meas. Sci. Technol. 17 2869.
C Occhiuzzi, C Paggi, G Marrocco, RFID tag antenna for passive strain sensing, Antennas and Propagation (EUCAP), Proceedings of the 5th European Conference on Antennas and Propagation, pp. 2306-2308, 2011.
Xiaohua Yi, Terence Wu, Yang Wang, Roberto T. Leon, Manos M. Tentzeris, Gabriel Lantz, Passive wireless smart-skin sensor using RFID-based folded patch antennas, International Journal of Smart and Nano Materials vol. 2, Iss. 1, 2011.
Chang, et al. "Functional Antenna Integrated with Relative Humidity Sensor Using Synthesized Polyimide for Passive RFID sensing" Electronic Letters, Mar. 1, 2007, vol. 43, No. 5.
Caizzone, et. al. "Multi-Chip RFID Antenna Integrating Shape-Memory Alloys for Detection of Thermal Thresholds" IEE Transactions of Antennas and Propogation, vol. 59, No. 7, Jul. 2011.
Marrocco, et al. "Multiport Sensor RFIDs for Wireless Passive Sensing of Objects—Basic Theory and Early Results" IEE Transactions of Antennas and Propogation, vol. 56, No. 8, Aug. 2008, pp. 2691-2702.
Capdevila, S. et al. "Passive RFID based sensing" 2011 IEEE International Conference on RFID-Technologies and Applications, pp. 499-504.
Siden, Johan "Remote Moisture Sensing Utilizing Ordinary RFID Tags" IEEE Sensors 2007 Conference, pp. 308-311.
Santiago, et al. "RFID Multiprobe Impedance-Based Sensors" IEE Transactions on Instrumentation and Measurement, vol. 59, No. 12, Dec. 2010, pp. 3093-3101.
Occhiuzzi, et al. "RFID Passive Gas Sensor Integrating Carbon Nanotubes" IEE Transactions on Microwave Theory and Techniques, vol. 59, No. 10, Oct. 2011, pp. 2674-2684.
Bhattacharyya, et al. "RFID Tag Antenna Based Temperature Sensing" IEE RFID 2010, pp. 8-15.
Chen, et al., "Coupling Passive Sensors to UHF RFID Tags" IEEE 2012, pp. 255-258.
Chen, et al., "Vector Backscattered Signals Improve Piggyback Modulation for Sensing with Passive UHF RFID Tags" IEE Transactions on Microwave Theory and Techniques, vol. 59, No. 12, Dec. 2011, pp. 3538-3545.
Shrestha, et al. "A Chipless RFID Sensor System for Cyber Centric Monitoring Applications" IEEE Transactions on Microwave Theory and Techniques, vol. 57, No. 5, May 2009, pp. 1303-1309.
Dowling, et al. "Smart House" and "Smart-Energy" Applications of Low-Power RFID-based Wireless Sensors IEEE 2009, pp. 2412-2415.
Tentzeris, et al. RFID-enabled Ultrasensitive Wireless Sensors Utilizing Inkjet-printed Antennas and Carbon Nanatubes for Gas Detection Applications.
Balachandran, et al. SnO2 Capacitive Sensor Integrated With Microstrip Patch Antenna for Passive Wireless Detection of Ethylene Gas, Electronics Letters, Mar. 27, 2008, vol. 44, No. 7.

* cited by examiner

BACKSCATTER RFID SENSOR WITH A BEND TRANSDUCER

BACKGROUND

1. Field of the Description

The present invention relates, in general, to methods and systems for sensing the bend of an object such as a human joint (e.g., curling of a person's finger), and, more particularly, to a wireless backscatter bend sensor and systems and methods for processing signals or data from the bend sensor to quantify bend of an object upon which the bend sensor is mounted or attached.

2. Relevant Background

There are numerous settings where it is desirable to sense motion of objects such as whether or not an object is bent and, if so, to what degree is the object bent. For example, it may be desirable to sense the motion of a hand or of fingers of the hand for use in motion capture systems and for use in human computer interaction devices. In other cases, a bend sensor may be used to sense bend in applications requiring monitoring the health or status of a structure.

More specifically, in theme parks and other environments, it would be useful to provide visitors of the park with gloves that can be used to interact with robotic characters, interactive displays, and so on to obtain a user-controlled and immersive entertainment experience. If a bend sensor (or sensors) was imbedded in each finger of the glove, it would be possible to sense when and to what extent the fingers were bent, e.g., wiggle your fingers and a nearby robotic character also wiggles its fingers or otherwise responds to the visitor or glove user's control input. The bend sensing ability would allow the visitors/users to manipulate objects in the nearby environment that may otherwise appear inanimate, thereby creating a unique and exciting experience.

For this exemplary and many other uses, the bend sensor would preferably meet a number of design goals or criteria. First, it may be preferred that the bend sensors be inexpensive so that a park or other facility operator can distribute the sensors without charge or at relatively low fees to the users. The goal of an inexpensive bend sensor may also be furthered by eliminating or limiting the amount of conventional electronics typically provided with sensors such as analog-to-digital converters, amplifiers, and the like. Second, the bend sensor may be designed to have low power consumption and even be passive in some cases (e.g., not require a battery or other bulky and costly power source). Third, the use of the bend sensor may be adapted or configured such that the resolution and/or the degrees of freedom may be relatively low, which will also further the first and/or second goals of lower costs and low power consumption by simplifying the sensor design. Fourth, it typically is preferable that communications between the sensor and processor/controller be wireless such that the user is free to move about their environment.

Previous bend sensors have typically not met one or more of these goals with many bend sensors being costly, requiring significant amounts of power (e.g., an onboard battery), providing high resolution and degrees of freedom (adding to complexity of the design and output signal processing), and using a wired or direct communication link between the sensors and the processor/controller. With regard to hand joints, gloves have been designed and produced to sense the angle of hand joints or bend of fingers. These gloves are often referred to as data gloves and may utilize fiber optics linked to a processor or sensors relying on piezoresistive materials, such as conductive elastomers, conductive ink, sliding resistors, and conductive fluid. In other cases, such as for use with robotic devices, numerous strain gauges may be provided on or near joints. Each of these solutions to monitoring or sensing bend or motion may be expensive to design and manufacture, thereby limiting their use in many situations where cost is a significant parameter.

Hence, there remains a need for a bend sensor that meets the demand for a wireless sensor that can be implemented at low cost. Preferably, such a sensor would be passive or semi-passive and not require an onboard power source or a charge pump. The sensor, in some cases, may also be relatively low resolution with its output or sensing signals leading to less complex processing to determine sensed bending or movement of a monitored joint or other object.

SUMMARY

A system is provided for sensing bending of a monitored object such as a robot or human joint. The system includes a radio frequency (RF) reader transmitting a read signal and, in response, receiving a reflected signal. The system further includes at least one wireless bend sensor (e.g., a sensor provided on or in a glove worn by person interacting with an entertainment environment or the like). The bend sensor includes an antenna, a chip electrically connected to the antenna, and a bend transducer electrically connected to the chip. In operation, the antenna receives the read signal and transmits the reflected signal (e.g., based on an absorbing or reflecting impedance of the chip). Significantly, the reflected signal is modulated based on a bend radius of the bend transducer to allow determination of bend of the object.

The bend transducer typically includes a microwave structure or a transmission element (e.g., a microstrip transmission line made of copper or the like) physically coupled to the monitored object such that the transmission element is deformed with movement of the object, i.e., to vary the bend radius, which is defined as the radius of curvature around which the tag is bent. The bend transducer is configured to have differing impedances corresponding to a plurality of values of the bend radius such that the reflected signal is modulated with bending of the transducer. Typically, the bend transducer is linked to the chip so as to define a reflecting impedance of the chip (rather than affecting the absorbing impedance of the chip). In this way, the reflecting impedance of the chip varies with the bend radius of the bend transducer to directly modulate the reflected signal with bending. Often, it is desirable to avoid bending of the antenna, and the bend transducer may be spaced a distance apart from the chip and the antenna, whereby the bend transducer is deformed independently from any deforming of the antenna.

In some embodiments, the RF reader includes memory storing a set of the values of the bend radius and, for each of the bend radius values in the set, a signal parameter. Instead of use of a lookup table to determine bend of an object, the bend may be determined other ways such as analytically (e.g., use of a mathematical equation) or using an optimization algorithm. Further, the RF reader comprises a bend determination module (e.g., software or code run by a processor of the reader) processing the reflected signal to determine a reflected signal parameter (such as phase and/or amplitude). Then, the bend determination module determines an amount of bend of the monitored object by comparing the determined parameter of the reflected signal with the stored signal parameters in the lookup table. This may involve interpolation when the determined parameter falls between stored parameter values for differing bends, and the greater the number of values stored in memory the more accurate the bend determination will be in practice.

DETAILED DESCRIPTION

Figure 1:
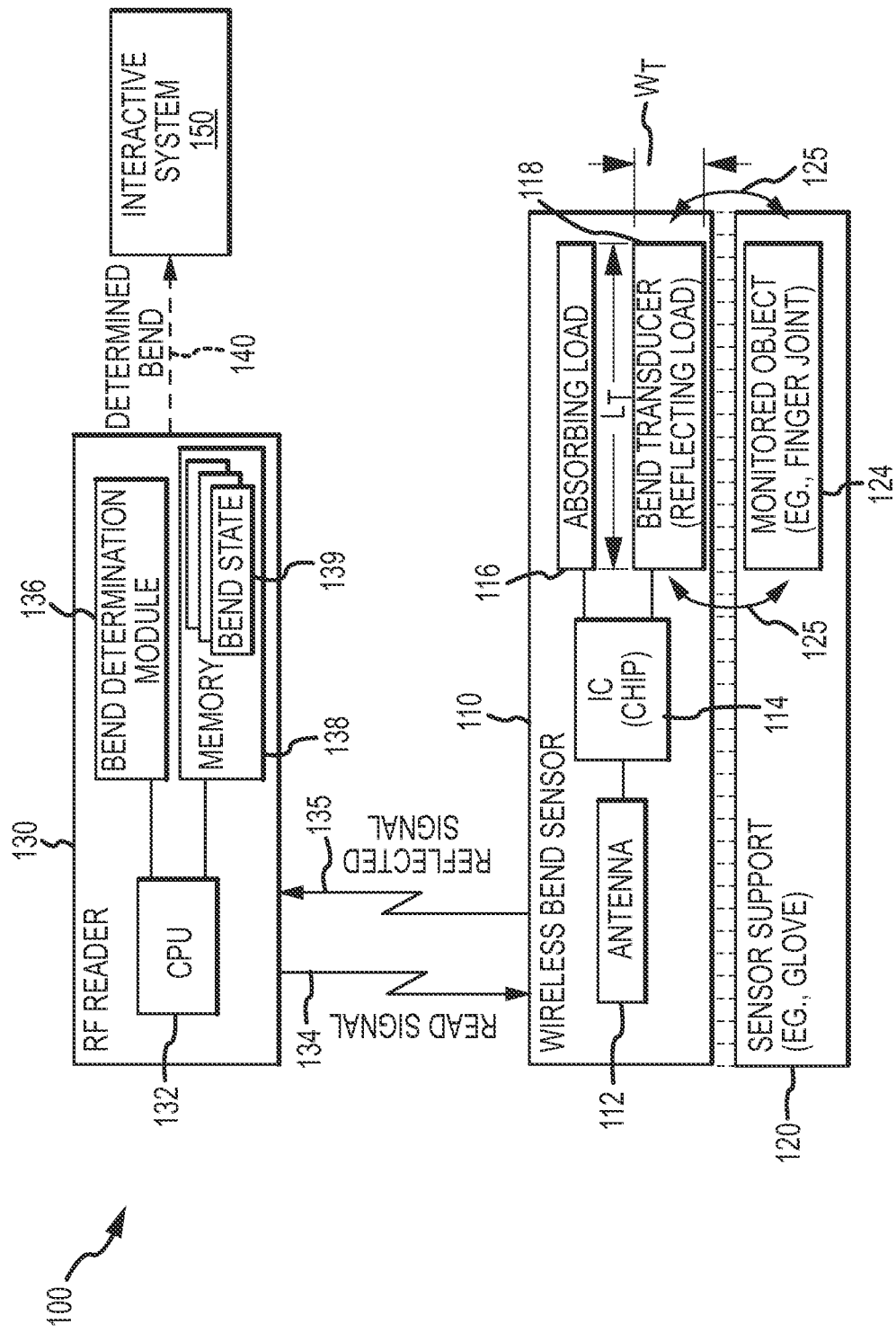
FIG. 1 illustrates a functional block diagram of an exemplary assembly or system using a wireless bend sensor as described herein to sense bending of monitored object such as a finger or other joint.

Briefly, the present description provides a design for a wireless bend sensor using backscatter radio frequency (RF) tags (also interchangeably referred to as radio frequency identification (RFID) tags) which may be operated at a frequency such as 5.8 GHz or another frequency or frequency range such as the 902 to 928 MHz ISM (industrial, scientific, and medical) band and the 2400 to 2483.5 MHz ISM band. While many conventional wireless sensors require an analog-to-digital converter and RF transmitting hardware, the wireless bend sensor does not have such tag complexity, in part, because the sensor includes a transducer for sensing bend of a joint or other object to which it is attached/affixed and, more significantly, because the transducer directly modulates the carrier signal sent from the RFID reader.

The transducer is an integral part of the RF tag's transmission circuit such as a variable load portion of the RF tag's chip (or integrated circuit). The result is that the hardware complexity and power consumption are reduced for the bend sensor such that, in principle at least, the bend sensor may be a passive sensor, i.e., requiring no internal power source. The sensor is designed to be very low power. It may be operated as a semi-passive or battery assisted (BAP) tag, i.e., a small battery or other power source may be used to power the circuitry on the tag but not for transmitting signals. In other cases, the tag may be made completely passive, i.e., no onboard power source. The passive tag has the advantage of being very inexpensive but will likely have a smaller read range.

The wireless bend sensor described herein would be useful for applications where small, lightweight, and low maintenance sensors are required or desired. Examples of such applications include game controllers, human computer interaction devices, and motion capture systems. One particular example, which is of interest to theme park operators and others, is to create magical gloves that can be purchased or distributed to visitors to a facility to allow the visitors or glove users to interact with their environment. In one implementation, a backscatter bend sensor is embedded in one or more fingers of the glove. In two or more finger implementations, a completely separate sensor may be provided on each finger. However, depending on the size of the sensor, there may not be room in a glove for all the antennae and they may interact with each other. For application other than gloves, this may be acceptable. Another approach, though, is to use multiple transducers (one for each finger) and a single RF tag antenna. This approach may use RF switching circuitry to switch between each transducer in a time-multiplexed fashion. In yet another approach, multiple transducers are used with each finger and a single RF tag antenna. Each transducer is configured in this embodiment to respond at a different frequency. The reader would be adapted to interrogate the sensor with different carrier frequencies to read the bend of the different transducers (and fingers in this example).

A reader with signal processing software (or a bend determination module or similar computer programs or code) processes returned signals or data communications from the bend sensor to wirelessly sense when and to what extent the finger or fingers are bent by the glove wearer/user. This sensing ability (sense when a joint or other object is bent) allows the wearer of the glove to manipulate objects in their environment, as sensed bending information is provided to a controller of such objects, to manipulate objects that may otherwise appear inanimate, which creates a unique interactive experience. The wireless bend sensors may be made passive requiring no batteries or maintenance, may be designed to only work in the vicinity of the object to be manipulated, and, because the sensors are built based on backscatter RF tag technology, may be manufactured at a cost point suitable for many applications (e.g., passive RFID tags typically cost several tens of cents such as 30 to 50 cents U.S. and similar costs may apply to the bend sensor including the transducers described herein).

Prior to turning to the figures and particular implementations of a wireless bend sensor (and systems using such a sensor to provide user interactivity), it may be useful to more generally describe the problem environment and how a wireless bend sensor may be designed to make use of RF tag technology to measure bending. In general, a backscatter RF tag system relies on the wireless communication between a reader and an RF tag. The reader transmits radio frequency (RF) power and data to the tag, while the tag communicates by modulating the electromagnetic waves scattered from its antenna.

The amplitude and phase of the scattered waves can be changed by creating an impedance mismatch between the impedance of the tag antenna and the tag microchip (or "chip"). In a conventional backscatter RF tag system, for example, the chip input impedance, which operates as the antenna load, is switched between two values representing a logical "0" and a logical "1." A wireless bend sensor may be formed from an RF tag to sense displacement by integrating a transducer that changes its electrical impedance as a function of mechanical deformation or "bending" of the joint/object to which the transducer is attached or mounted. As the transducer is bent or otherwise mechanically deformed, its changing impedance causes an amplitude and phase change in the backscattered signal that can be detected wirelessly by the RF tag reader and its processor and processing software.

There were two potential ways to integrate a transducer into a backscatter RF tag that were considered by the inventors for the wireless bend sensor: as an antenna transducer and as a chip transducer. In the antenna transducer approach, the tag's antenna is used as the transducer. The amplitude and phase of the backscattered signal are altered as the antenna is mechanically deformed. While this approach has the advantage that it can be used with commercially available RF tag integrated circuits (ICs) or chips, the signal parameters (i.e., the reflection coefficients) in both the absorbing and reflecting modes change with deformation. The result is that it may be difficult to detect the different bending states at the reader without, for example, comparing the signal change to a separate reference tag. In addition, the IC power supply varies due to displacement, which may render a passive RF tag inoperable.

In contrast, a chip-based transducer avoids this problem by using a transducer separate from the tag antenna. In one preferred embodiment, the transducer is provided in the bend sensor so as to be attached as one of the antenna's loads and, thus, changing only one signal parameter (i.e., the reflection coefficient in the reflecting state) with respect to displacement. With bending or mechanical deformation, the transducer's input impedance changes, which directly causes the phase and/or amplitude of the modulated backscatter signal to be altered or modified. The RF reader uses a bend determination module or similar software to process the altered/modified backscatter signal to determine when and to what extent the transducer and associated joint/object have been bent. Hence, the embodiments described herein make use of a chip transducer rather than an antenna transducer.

There are many useful ways to provide a chip transducer to sense the bend of an object. The transducer may be configured based on the fact that resonant structures, such as patch antennas, show a shift in resonant frequency and input impedance when they are bent. Particular details of prototyped and planned transducer design are provided in the discussion below. As mentioned above, the bend sensor may be made to be passive (i.e., requiring no local power source) and to be inexpensive. Whether or not the sensor is designed to be passive may depend on the range at which it is intended to be used. Passive bend sensors will have relatively short ranges, e.g., 1 to 3 meters, while battery-assisted bend sensors will have longer ranges, e.g., greater than 3 meters. Furthermore, whether or not the tag is passive may depend on the conditions in which it is to be used (i.e., whether the incident power is constant or known or whether the tag is at a fixed distance from the reader).

The open-circuit microstrip transmission line used in some embodiments herein is only one way to create a backscatter bend sensor. Another technique being explored is to make the transducer out of liquid metals. The design of the bend sensor is the same as described except a microwave structure is created for the transducer using liquid metals. Since the metal alloy (e.g., eutectic gallium indium (eGaIn)) is liquid at room temperature, it is easy to deform which makes it a useful bend sensor. The transducer can be made out of a flexible material such as silicone or rubber, and the liquid metal can be injected into microchannels in the material. As the structure is mechanically deformed, the configuration of the metal changes in the microchannels, and, hence, the input impedance of the transducer changes.

FIG. 1 illustrates a functional block diagram for a system or assembly 100 making use of the chip-based bend transducer to sense bending. Particularly, the system 100 includes a wireless bend sensor or RF tag 110 that includes an antenna 112 and an integrated circuit (IC) or chip 114, which may switch between a fixed or known impedance (i.e., the absorbing load 116) and one provided by a bend transducer 118. As shown, this may be thought of as the chip 114 having a load 118 that varies with mechanical deformation or bending 125 of the bend transducer 118. The bend transducer 118 may have a length, $L_T$, and width, $W_T$, chosen to suit the design of the transducer 118 (e.g., to vary the impedance or the operating frequency in a desired manner) and/or chosen to suit a monitored object 124 (e.g., a length chosen to match a finger joint or other bending/moving portion of the object 124).

As shown, the bend sensor 110 may be attached to or mounted to a sensor support 120 such that the bend transducer 118 bends 125 with bending of the monitored object/joint 124. For example, the sensor support 120 may be a glove that can be worn by a user (e.g., visitor of a theme park or the like). In such an application, the glove 120 can be configured such that the bend transducer 118 is placed on the top or bottom of one or more finger joints so as to bend 125 with the movement of the joint or curling of the finger 124. Significantly, the transducer 118 is off-chip and separate from the antenna 112 such that these components 112, 114 do not have to be deformed during operation of the bend sensor 110. The glove or support 120 may be configured to position the antenna 112 and chip 114 apart from the bending/deforming motion 125 of the monitored object 124 such as on the back of the hand or between finger joints for a glove implementation of the support 120. It may also be possible to use a broadband antenna that will be less sensitive to deformation than the narrowband antennas typically used for backscatter RFID tags. Also, it may be advantageous to orient the transducer 118 such that any unintentional radiation from it is orthogonal to that from the antenna 112. In other words, it may be advantageous to have the transducer 118 and the antenna 112 cross-polarized.

The assembly 100 further includes an RF reader 130 with a processor or central processing unit (CPU) 132 that manages operation of the reader 130. This operation includes transmitting querying or read signals 134 to the bend sensor 110 in an ongoing manner. The bend sensor or RF tag 110 responds via the antenna 112 and chip 114 to transmit or reflect signals 135, which are modulated based on the load (comprised of the absorbing load 116 and the bend transducer 118) so as to indicate the present impedance of the bend transducer 118. It is envisioned the bend sensor 110 communicates by switching between the absorbing load 116 and the reflecting load (i.e., the bend transducer 118), and it should be noted that the chip transducer is included in the reflecting mode discussed in earlier paragraphs. The state of the bend transducer is calculated relative to that of the absorbing load, or, in other words, bend is determined by the difference between the reflection coefficient of the absorbing load and of the reflecting load, with the tag always switching between the two loads.

A number of signaling schemes may be used with the tag or sensor 110. One useful scheme may be labeled a type of differential signaling since the bend is determined relative to the signal received at the reader when the tag is in the absorbing state. The advantage of this differential signaling scheme is that the bend of the tag sensor can be determined independently of the distance between the reader and the tag. If a differential scheme is not used, the phase and amplitude of the signals received from the tag may undesirably vary as the reader-to-tag distance is changed.

The RF reader 130 further includes a bend determination module 136 (such as code or programming that causes the processor 132 to perform functions described herein) and memory 138 that are both managed or run by the processor 132. Briefly, the bend determination module 136 acts to compare reflected signals 135 (or data provided in such signals 135) with a number of bend states 139. The bend states 139 define values for the reflected signals 135 corresponding to states of the bend transducer 118 (relative to the reflected signals corresponding to the absorbing load 116) at a number of bend states or amounts of bending 125 such as with no bending (transducer 118 is planar) and then with a number (e.g., 1 to 10 or more) of bend amounts (e.g., degrees of bend or the like) increasing in magnitude. However, the number of bend states may be infinite such that it is possible for the bend transducer to produce continuous bend state information. Additionally, it should be noted that the bend may be determined analytically through the use of an optimization algorithm or other analytic technique.

The bend determination module 136, for example, may determine from the reflected signal 135 and bend state values 139 that the object 124 has not bent at all or bent from planar a particular extent (e.g., a 15 degree bend). The RF reader 130 may then operate to transmit or provide this determined bend amount 140 to an interactive system 150. The interactive system 150 may then operate to control one or more devices based on this input 140 (sensed bending of object 124). For example, the interactive system 150 may control movement of the fingers of a robotic character in a manner similar to the movement 125 sensed through the use of the wireless bend sensor 110. The particular interactive system 150 that uses the determined bend information 140 may vary widely to implement the system 100 as may the number and particular mounting location of the bend sensor 110, with one shown to ease explanation of the system 100.

With this understanding of a wireless bend sensor understood, it may be useful to return to a more general description of technical environment and then proceed to particular prototypes and implementations of wireless bend sensors according to the present invention. As discussed previously, the inventors recognized that a promising communication technology for wireless sensing applications is backscatter radio frequency identification (RFID) particularly in the ultra high frequency (UHF) and microwave range (although the invention clearly is not limited to such higher frequencies).

Backscatter RFID in wireless sensor networks relies on the radio communication between an RFID reader, acting as the control unit, and a multitude of passive or semi-passive RFID transponders, acting as sensor nodes. The principle communication for transmitting information from the transponder (tag or, in this case, bend sensor) to the reader relies on a modulated backscatter signal. All power for the transmission of the sensor data is drawn from the electromagnetic field radiated by the reader. Hence, their low power consumption makes backscatter tags appropriate for sensing applications, as described herein, that may benefit from use of small, lightweight, and low maintenance nodes, e.g., human-computer interaction applications in the entertainment and other industries.

To transmit sensor data (e.g., about the displacement or bend of a tagged object), a transducer can be integrated in a backscatter tag or bend sensor. The transducer, which changes its electrical impedance as a function of bending, can be integrated in a backscatter RFID sensor node (again, it may be worth noting that the terms "backscatter tag," "bend sensor," and "sensor node" may be used interchangeably in this description and accompanying figures and claims). The transducer's impedance change then directly modulates the backscattered signal in amplitude and phase. Consequently, the RFID reader can wirelessly detect the sensor data without power consuming analog-to-digital converters or other conventional radio frequency (RF) circuitry on the backscatter tag or bend sensor.

The wireless communication link between an RFID reader and a backscatter tag or wireless bend sensor can be divided into a forward link and a return link. In the forward link, the RFID reader transmits radio frequency (RF) power and data to the passive tag/bend sensor. In the case of a semi-passive tag, the reader only transmits data to the tag, which has its own power supply to activate the chip's circuitry. In the return link, whenever a reader command requires a tag's response, the tag/bend sensor starts its data transfer using modulated backscattering, i.e., the signal from the reader is reflected by the tag depending on the transmitted data.

Figure 2:
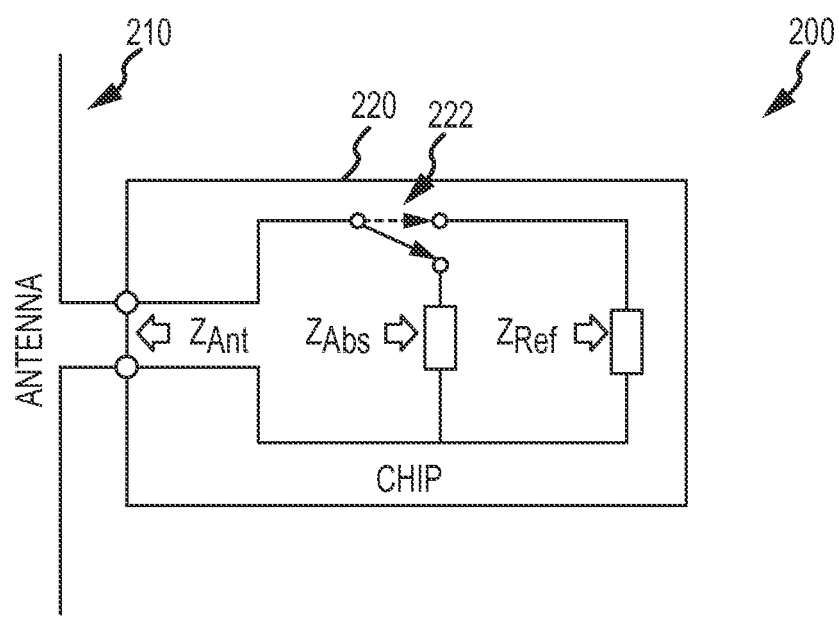
FIG. 2 illustrates a conventional RFID tag.

A conventional RFID tag consists of an antenna and a microchip, which can be characterized by their impedances. These impedances include reflecting and absorbing impedances of the chip ($Z_{Ref}$ and $Z_{Abs}$) and the antenna's impedance ($Z_{Ant}$). FIG. 2 shows such an RFID tag 200 including an antenna 210 and a chip 220, with the chip 220 having a switch 222 switching between chip loads or impedances $Z_{Ref}$ and $Z_{Abs}$. The match or mismatch between the impedances of the antenna 210 and the chip 220 determines whether power is absorbed or reflected by the tag 200.

To realize a modulated backscatter signal, the chip's input impedance is switched by switch 222 between two values, e.g., between the absorbing impedance, $Z_{Abs}$, and some other impedance known as the reflecting impedance, $Z_{Ref}$. These two impedances define the magnitude and phase of the RF signal backscattered by the tag and, thus, represent a logical '0' and '1' for transmission of the ID number of the tag 200. This information can be detected at the reader by observing the received signal at the reader which is proportional to the reflection coefficients of the absorbing and reflecting states, $S_{Abs}$ and $S_{Ref}$, of the RFID tag 200. The reflecting coefficients are defined as: $S_{Abs,Ref}=(Z_{Abs,Ref}-Z^*_{Ant})/(Z_{Abs,Ref}+Z_{Ant})$ where "*" is defined as the complex conjugate operator. The reflecting coefficients are related to the impedance of the tag antenna 210 and the impedance of the chip 220 in absorbing or reflecting mode.

In a conventional RFID tag such as tag 200, the antenna's impedance may be defined, for example but not limitation, as $Z_{Ant}=(20+j350)\Omega$, the chip's impedances are $Z_{Abs}=(20-j350)\Omega$ and $Z_{Ref}=(2-j0.1)\Omega$. The tag's response may be depicted graphically, such as with a Smith chart representation, with a characteristic impedance of $Z_{Ant}=(20+j350)\Omega$. Ideally, the reflection coefficient of the absorbing state is zero. This is true for impedance matching between the antenna 210 and the chip's absorbing impedance (i.e., $Z^*_{Ant}=Z_{Abs}$). As a consequence, all power sent by the reader is available at the internal circuitry of the chip 220 when the switch is connected to the absorbing load. This is especially important in the case of a passive tag.

Perfect impedance matching corresponds to a power transmission coefficient of $\tau=100\%$ and maximizes the power transmission in the forward link. The power transmission coefficient is defined as: $\tau=1-|S_{Abs}|^2$. To maximize the power in the return link of the backscatter system, the modulation efficiency should be increased. The modulation efficiency can be defined as: $\eta=\frac{1}{4}|S_{Abs}-S_{Ref}|^2$ (when the mean of the received baseband signal is removed) and depends on the distance between the absorbing and reflecting state. Here, a maximum modulation efficiency of 25 percent can be achieved.

With these concepts in mind, it may now be useful to discuss reasons for utilizing a chip transducer to provide a unique bend-state sensor. The inventors identified two promising solutions to integrate a transducer in a backscatter RFID tag (such as tag/sensor 110 of FIG. 1). One possibility is to use an antenna transducer and another one is to use a chip transducer.

In the case of an antenna transducer, the antenna's impedance changes with deformation $\Delta$, $Z_{Ant}(\Delta)$. With an antenna transducer, the displacement or bend can be detected by observing the backscattered power or phase (which both depend on both the reflecting and absorbing states). A change in antenna impedance influences both the absorbing state, $S_{Abs}(\Delta)$, and the reflecting state, $S_{Ref}(\Delta)$. The backscatter tag's parameters and their values for the antenna transducer and the chip transducer approach are: (a) antenna impedance ($Z_{Ant}$); (b) absorbing chip impedances ($Z_{Abs}$); (c) absorbing reflection coefficient state ($S_{Abs}$); (d) reflecting chip impedances ($Z_{Ref}$); and (e) reflecting coefficient state ($S_{Ref}$).

At this point, it may be useful to provide a listing of possible different configurations for the chip transducer and for the antenna transducer. For the chip transducer, the following different configurations may be useful in the same or differing applications: (1) Battery assisted (i.e., semi-passive) tag with no charge pump. Hence, tau is constant, Sabs is constant, and Sref(Delta); (2) Battery assisted (i.e., semi-passive) tag with a charge pump connected in series to the absorbing impedance or included in the absorbing impedance (hence, tau(P), Sabs(P), Sref(Delta)); (3) Battery assisted (i.e., semi-passive) tag with a charge pump connected in parallel to both the absorbing and reflecting impedances (hence, tau(P), Sabs(P), Sref(Delta,P)); (4) Passive tag (i.e., no on-board power source) with a charge pump connected in series to the absorbing impedance or included in the absorbing impedance (hence, tau(P), Sabs(P), Sref(Delta)); and (5) Passive tag (i.e., no on-board power source) with a charge pump connected in parallel to both the reflecting and absorbing impedances (hence, tau(P), Sabs(P), Sref(Delta,P)). For the antenna transducer, the following differing configurations may be useful: (1) Battery assisted (i.e., semi-passive) tag with no charge pump (tau(Delta), Sabs(Delta), and Sref(Delta)); (2) Battery assisted (i.e., semi-passive) tag with a charge pump connected in series to the absorbing impedance or included in the absorbing impedance (hence, tau(Delta,P), Sabs(Delta,P), Sref(Delta)); (3) Battery assisted (i.e., semi-passive) tag with a charge pump connected in parallel to both the absorbing and reflecting impedances (hence, tau(Delta,P), Sabs(Delta,P), Sref(Delta,P)); (4) passive tag (i.e., no on-board power source) with a charge pump connected in series to the absorbing impedance or included in the absorbing impedance (hence, tau(Delta,P), Sabs(Delta,P), and Sref(Delta)); and (5) passive tag (i.e., no on-board power source) with a charge pump connected in parallel to both the reflecting and absorbing impedances (hence, tau(Delta,P), Sabs(Delta,P), and Sref (Delta,P)).

For the antenna transducer, it may be important to understand that because of the change in the antenna's impedance, the signal parameters (i.e., the reflection coefficients) in both the absorbing and reflecting modes will change with deformation. The result is that it may be difficult to detect the different bending states at the reader without, for example, comparing the signal change to a separate reference tag. In addition, the power supplied to a passive sensor may vary with bending, which can be considered a disadvantage for forward-link-limited passive backscatter systems. In most, if not all, cases, the transducer is external to the chip to sense the bend. The transducer can be internal to the sensor (e.g., the entire tag device containing the antenna, chip, and transducer), but it is external to the silicon chip or IC. The main argument for use of an antenna transducer is that it allows use of off-the-shelf microchips in the sensor rather than relying on a new or modified chip (as described below). However, this benefit seems to be outweighed by the increased difficulty in detecting bend and loss of power problem(s).

In the case of a chip transducer, the transducer structure may be integrated in or linked to the part or physical portion of the backscatter chip that characterizes the reflecting impedance, $Z_{Ref}(\Delta)$ (e.g., the transducer is external to the chip but directly modulates the reflecting impedance). A transducer included in the absorbing impedance would again, as in the case of the antenna transducer, lead to a power supply that changes with respect to bend. This may render passive tags inoperable. With inclusion in the reflecting part of the chip, though, a constant absorbing state with respect to the bending state can be beneficially achieved. This can be seen with inspection of the backscatter tag's parameters provided earlier. The displacement information can be detected by observing the reflecting states of the tag's response (e.g., with a bend determination module 136 accessing memory 138 to determine a bend state 139 based on the tag's response 135 as shown in FIG. 1). The displacement information is determined by looking at the difference between the signals received from the sensor when it is in the absorbing and reflecting states.

A preferred configuration (see, for example, the configurations listed in above in para. [0042]) for use of the chip transducer and the differential signal scheme is with a battery assisted (i.e., semi-passive) tag with no charge pump. Other configurations including a charge pump will (whether in series with the absorbing impedance or in parallel with both the absorbing and reflecting impedances) cause the reflection coefficients to be a function of power incident from the reader and complicate determination of the bend. However, if the incident power is constant or known, the chip transducer can be used in any configuration without increased complexity. Furthermore, if the tag is at a known distance from the reader, the bend can be determined from the signal received when the tag load is connected to the reflecting impedance alone (i.e., without comparing the signal with the absorbing load) for the case where the tag is semi-passive or passive with a charge pump connected in series to the absorbing load."

Figure 3:
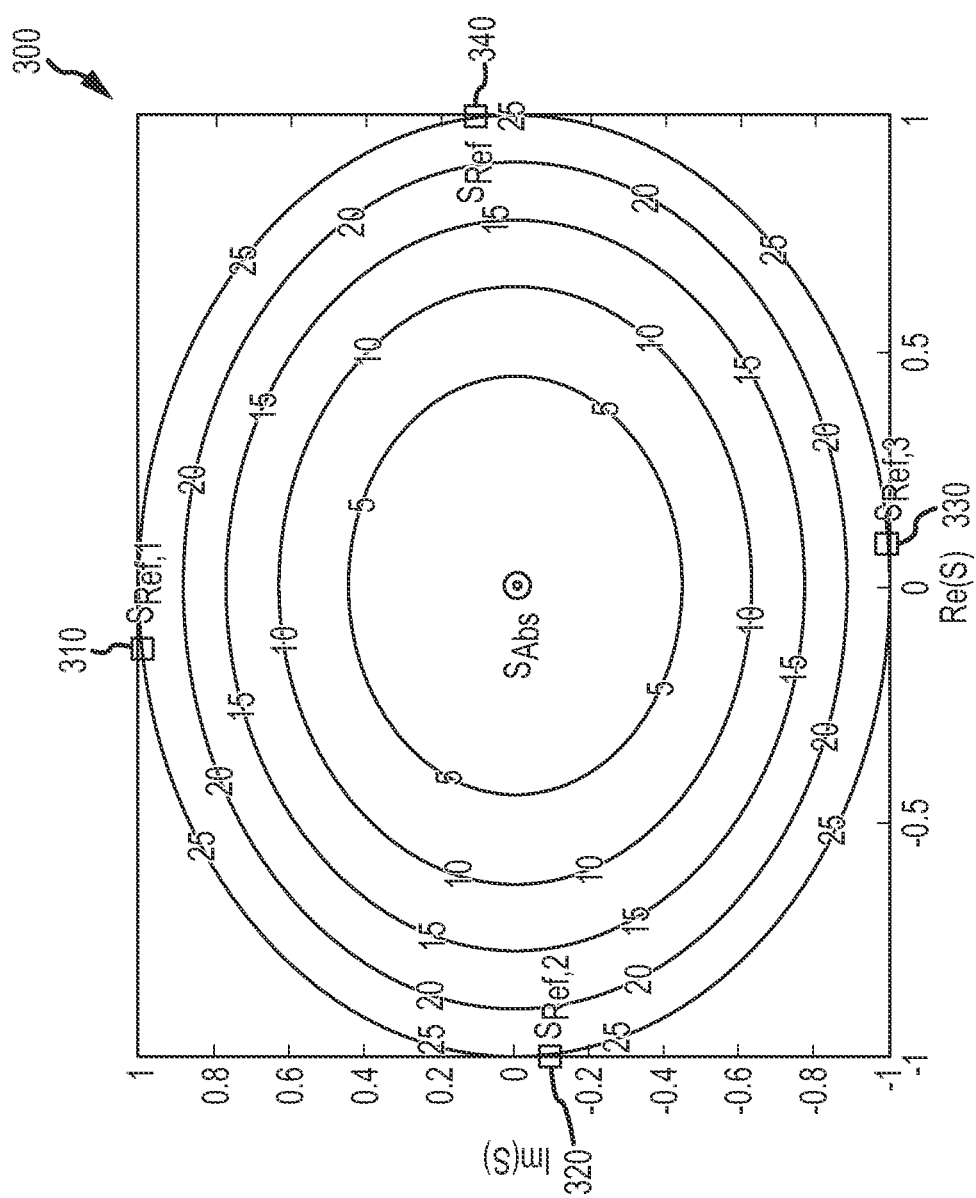
FIG. 3 illustrates a diagram of tag response of an ideal transducer showing four exemplary reflecting states.

Tag response of an ideal chip transducer may be diagramed, as shown with diagram 300 of FIG. 3, to show the absorbing state and, for example, four different reflecting states 310, 320, 330, and 340. The reflection coefficients of the reflecting states 340, 310, 320, 330 correspond to four distinct impedances, respectively: $Z_{Ref}=(2-j0.1)\Omega$, $Z_{Ref,1}=-j332.5\Omega$, $Z_{Ref,2}=-j351\Omega$, and $Z_{Ref,3}=-j372\Omega$. It can be seen in diagram 300 that the available range of reflection coefficients is optimally used. This leads to a high sensitivity of the backscatter sensor to bending, i.e., large differences in phase of the reflection coefficients. In addition, maximum modulation efficiencies are reached by these reflection coefficients. The contour lines of constant modulation efficiency are additionally shown in the diagram 300. As mentioned earlier, the bend states can be continuous, and the diagram 300 shown in FIG. 3 is only exemplary. For a fixed number of bend states, as shown in FIG. 3, one reason one may want them separated as much as possible is to make it easier for the reader to distinguish between the states in the presence of noise. For example, if a very high signal-to-noise ratio (SNR) is present, the bend states can be close together without loss of performance. However, if the SNR is low, one may want the bend states as far apart as possible. The spacing of the bend states is expected to be non-uniformly distributed for a real (or non-theoretical) transducer.

Such an ideal chip transducer structure leads to high performances in the forward and backward link of a passive RFID system and also to a high sensitivity to displacement. One issue, which can readily be addressed, with a chip transducer is that it may be necessary to design a custom-built chip, which may be bigger than a conventional chip for an RFID tag. Alternatively, as discussed above, the transducer may be external to the chip such that the sensor as a whole may be larger than a typical RFID tag but the chip itself may be normal or conventional in size. In the following discussion, designs and prototypes for a chip transducer solution are presented, and, from this discussion, it will be apparent to one skilled in the art that a wireless bend sensor with a chip transducer promises to be a highly desirable solution in terms of low power or passive tags.

With regard to backscatter system performance, the chance of a limitation in the passive RFID system's forward link may be minimized with the integration of the transducer structure in the tag's reflecting state. In addition, limitations in the backscatter system's backward link preferably are limited or even minimized. Hence, one goal in efficient transducer design is the enhancement of the modulation efficiencies of the different reflecting states generated by the transducer with bending. In addition to an increase in modulation efficiency, a high sensitivity due to bending is desirable, and this sensitivity can be enhanced by increasing the phase differences between the individual reflecting states. The phase differences can be defined by the following: $\Delta\phi_{i,i+1} = \phi(S_{Ref},i) - \phi(S_{Ref,i+1})$, where $\phi$ is the phase of $S_{Ref}$ and $i = 1 \ldots N$, and N is the number of bending states. The detection of the different bending states is enhanced with an increase of the phase differences between the individual states.

For a better evaluation of the different chip transducer structures, a backscatter transducer performance parameter, $\alpha$, is defined by: $\alpha = (\eta_{min}/0.25 \times \Delta\phi_{min}/360°/N)^{1/2}$, where $\eta_{min}$ is the smallest modulation efficiency of all the bending states and $\Delta\phi_{min}$ is the smallest phase difference of all the bending states. It can be seen from this equation that the backscatter transducer performance depends on the minimum modulation efficiency of the backscattered signals and also on the minimum phase differences between the individual reflecting states. The backscatter transducer performance parameter is useful in finding transducer structures that show better performance in terms of sensing abilities and also in terms of the backscatter backward link's communication range. The ideal transducer, as discussed above, then reaches a performance of 100 percent.

Figure 4:
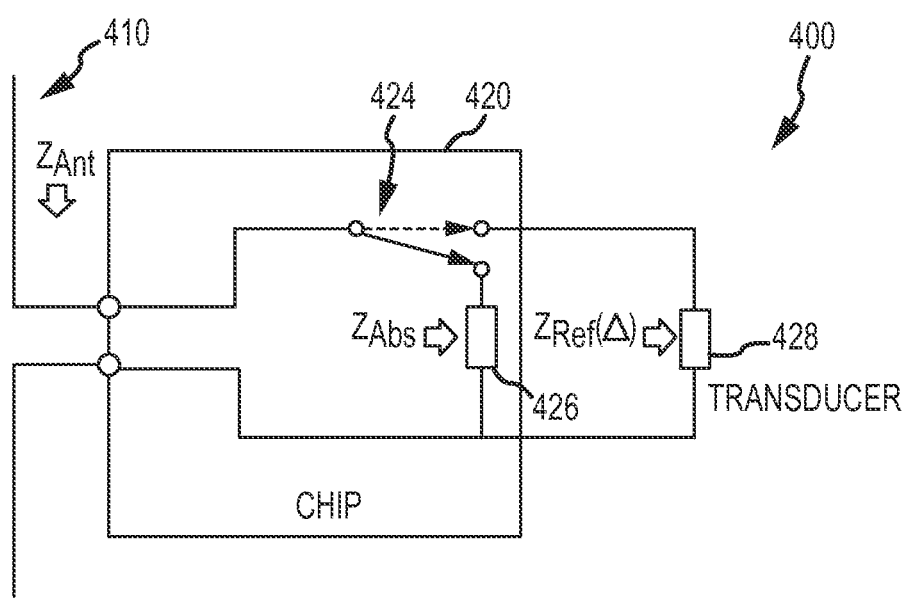
FIG. 4 is a schematic drawing of a wireless bend sensor (or an RFID tag with a chip transducer) for sending bending/displacement.

FIG. 4 illustrates a schematic of an exemplary wireless bend sensor 400 of the present invention. As shown, the sensor 400 (or custom RFID tag) has an antenna 410 and a chip 420 with circuitry for reflecting data or information back to an RF reader (such as reader 130 of FIG. 1 with reflected signal 135). To this end, the sensor 400 is shown to include a transducer 428 that varies the reflected impedance, $Z_{Ref}$ with displacement or bend, $\Delta$, of the transducer 428. The chip 420 is configured with a switch 424 for switching the load of the chip 420 between an absorbing impedance, $Z_{Abs}$, provided by element 426 and impedance, $Z_{Ref}(\Delta)$, provided by the chip transducer 428, which varies with its bend state or amount of displacement.

Figure 5:
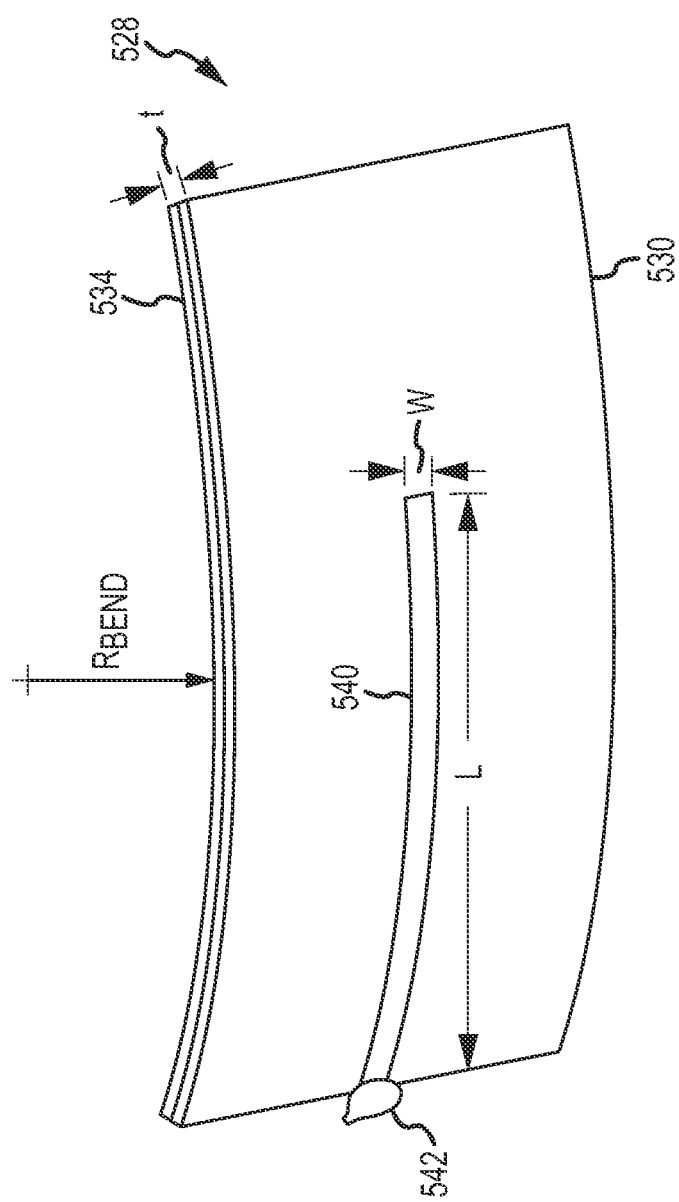
FIG. 5 shows a top view of one implementation of a chip transducer for use with a wireless bend sensor such as the sensors of FIGS. 1 and 4.

FIG. 5 shows a top view of one implementation of a chip transducer 528 for use with a wireless bend sensor. For example, the bend transducer 528 may be used for the bend transducer 118 of the bend sensor 110 of FIG. 1 or for the bend transducer 428 of the bend sensor 400 of FIG. 4. As shown, the bend sensor 528 includes a planar substrate 530 formed of a flexible dielectric material (e.g., Pyralux FR9150 available from DuPont) that is relatively thin, e.g., thickness, t, may be less than about 0.2 mm such as 0.08 to 0.13 mm thick but, of course, the thickness may vary widely in practice. The bend sensor 528 further includes a ground plane 534, e.g., a thin film or sheet of copper or other conductive material that may be laminated onto the back side of the substrate 530.

The bend sensor 528 further includes an upper conductor or transmission line/element 540 that is affixed to or mounted to the upper surface of the substrate 530 opposite the ground plane 534. The transmission element 540 may be a strip of copper or other conductor with a length, L, and width, w, that are both less than the length and thickness of the substrate 530 such as less than 50 to 100 mm in length (with a length, L, of 55 mm used in one prototype transducer) and less than 5 to 10 mm in width (with it being understood that these physical parameters may vary widely to practice the invention, e.g., dimensions may depend on the desired frequency of operation, the desired $Z_{Ref}$, and which resonance of the transducer is to be used).

A connector 542 (which may simply be a pin or solder joint) is provided at one end of the transmission element 540 for connection to the circuitry of the chip such as to a portion of the chip load (reflecting state) selectable by operation of a switch on the chip. The amount of the bend of the transducer 528 is shown as bend radius, $R_{Bend}$, which causes variance in impedance of the transducer 528. The transducer 528 typically would be provided as part of the wireless bend sensor in a portion spaced apart from the antenna and chip such that the transducer 528 may be bent (e.g., adjacent to a joint portion of a glove or the like) while the antenna and chip are not deformed (e.g., provided in a part of a glove or the like that does not deform with movement of the wearer such as on portion of the glove covering the non-joint portion of a finger or back of hand).

The inventors built a prototype of a chip transducer for use in a bend sensor in the form shown in FIG. 5, and the backscatter transducer was proven to be useful in sensing bend via its open-circuited microstrip resonator (or chip transducer). The transducer's input impedance was investigated for three exemplary bending states each defined by the bend radius, $R_{Bend}$, of the transducer (or its substrate and transmission element), which as tested was provided by bending the transducer about two different cylinders such that the bend radius, $R_{Bend}$, was equal to the cylinder radius for each cylinder. Particularly, as tested, $R_{Bend} = \infty$ represents the planar or no bend state/case, while $R_{Bend} = 21.1$ mm and 84.1 mm represent the two bending states with decreasing curvature of the test cylinders. In the testing of the prototype transducer, the transducer's input impedance versus bending was measured with a vector network analyzer (VNA), and an SMA (SubMiniature version A) connector was used to feed the structure and the VNA's calibration was adjusted accordingly.

Figure 6:
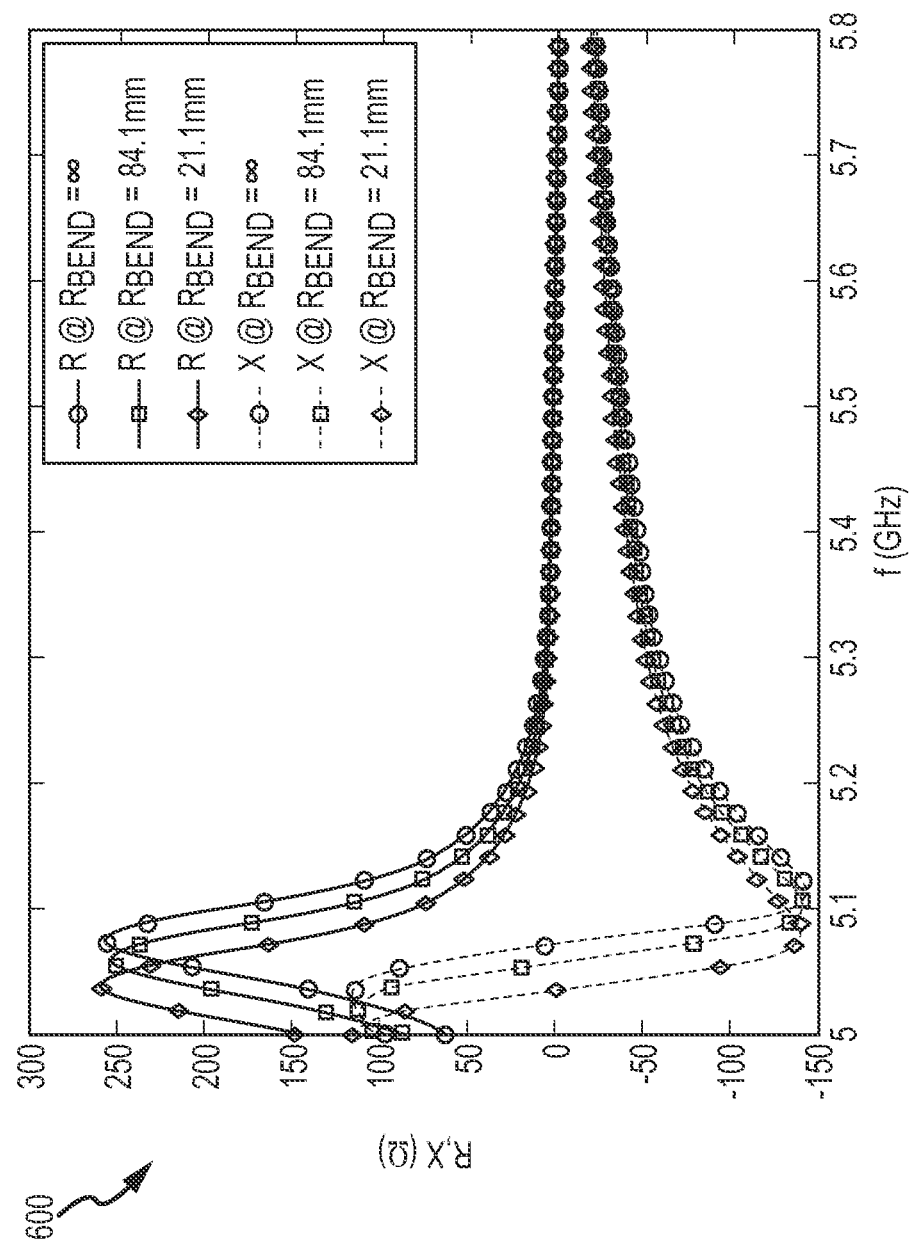
FIG. 6 is a graph comparing measured transducer input impedance versus frequency for a number of tested bending states of a prototype chip transducer.

FIG. 6 provides a graph 600 comparing measured transducer input impedance versus frequency for a number of tested bending states of the prototype chip transducer. Note, the frequencies used were in the range of 5 to 5.8 GHz as higher frequencies are likely to be useful to allow better sensing of bending with smaller sized transducers but the inventive concepts may be used with other frequencies of the signals (e.g., the read signal 134 shown in FIG. 1). The graph 600 of FIG. 6 shows the transducer's input impedance versus frequency for the three tested bending states for the prototype transducer. "R" is the real part and "X" is the imaginary part of the measured transducer's input impedance (i.e., $Z = R + jX$). It can be seen from the graph 600 that the transducer's resonant frequency shifts to lower frequencies when it was bent, and, thus, the prototype chip transducer shows a desired change in its input impedance with bending that lends itself to use in a wireless bend sensor using backscatter RFID technology.

In practice or when integrated in a backscatter RFID tag (or bend sensor), the transducer will be operated in the resonator's capacitive range to realize a strong backscatter signal (e.g., signal 135 in FIG. 1). In other cases, depending on the tag design (in particular, the impedance of the tag antenna and charge pump), one may choose to operate the transducer in its inductive range (as opposed to its capacitive range) to ease impedance matching with the tag antenna. In testing, the realized impedance values at a frequency of 5.8 GHz were: (a)

$R_{Bend}$ (mm)=∞, Z(Ω)=1.21−j21, Δφ(°)=NA (or $R_{Bend}$ (mm)=∞ may be considered the reference for these values), η(%)=10; (b) $R_{Bend}$ (mm)=84.1, Z(Ω)=1.15−j20.3, Δφ(°)=16.5; η(%)=11; and (c) $R_{Bend}$ (mm)=21.1, Z(Ω)=1.37−j18.1, Δφ(°)=60.2; η(%)=11. Operating the resonator at 5.8 GHz, not at its self-resonance, reduces unintentional radiation from the structure.

The highest backscatter transducer performance (i.e., α=100%) may be reached by reflecting impedances with low resistance values and high differences in the reactance values. As a consequence, strong and narrow-band resonances are likely beneficial for enhancing performance of the bend transducer. Better transducer designs may be reached by maximizing the magnitude of the tag's/sensor's response, i.e., the magnitude of the modulated backscatter that improves the whole backscatter RFID system's performance, and also by maximizing the phase difference between each state, i.e., between modulated backscatter signals due to bending to increase the sensitivity for detection of displacement.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The backscatter bend transducer taught herein takes advantage of the fact that resonant structures (e.g., patch antennas and the like) change their resonance when bent along the direction of wave propagation. Other principles of operation may be useful for the transducer to provide a transducer whose impedance (capacitance, inductance, resistance, or some combination thereof) changes with deformation. For a given frequency, a change in resonance implies a change in impedance. The bend sensor systems (such as system 100 of FIG. 1) may use this impedance change to sense (or to determine) the curvature or "bend" of an object upon which the chip transducer of the wireless bend sensor is mounted or supported. The chip transducer may, in a simple example, take the form of a strip of copper tape adhered to a flexible substrate including a ground plane opposite the upper conductor or transmission element. However, some embodiments may provide improved performance by operating near first or second resonance of the microstrip resonator, by using thinner microstrip lines for the upper conductor/transmission element, and/or by using a lower loss substrate.

As will be appreciated, one useful aspect of the wireless bend sensor described herein is that it directly modulates or changes the signal reflected back to the reader based on the amount of bend of the chip transducer. The chip transducer may be nearly any structure that provides this functionality such as component that acts similar to a patch antenna (mechanically similar) such that its input impedance changes as its structure is bent (e.g., place center portion of chip transducer adjacent a joint to bend or have its bend radius change with joint movement). A switch is provided in the chip circuitry to provide switching, in response to a reader or forward signal, between a fixed impedance and a variable impedance based on the bend state of the chip transducer (e.g., provided in the reflecting state/portion of the chip).

A processing module associated with or part of the RF reader processes the reflected signal to determine an amount of bend of the transducer (and associated, monitored object), e.g., by looking at amplitude and phase of the reflected signal corresponding to the fixed impedance of the tag and amplitude and phase of the reflected signal associated with the variable impedance of the tag. Some embodiments utilize a stored look up table with a number of previously characterized bend states such as 3 to 10 bend states to allow interpolation to determine a particular amount of bend. For example, bend radii of 20 and 40 mm may be in the table with associated reflected signals (or data such as signal amplitude and phase), and a received signal may fall between these two values to allow the processor to interpolate to obtain amount of bend (e.g., half way between would lead to a 30 mm bend radius being determined by the reader). The greater the number of bend states previously characterized, the greater the resolution that may be provided by the bend sensor as finer interpolation will be enabled. The transducer can respond in a continuous manner with respect to deformation (i.e., infinite bend states).

While a wide variety of frequencies may be used for the read signal (e.g., signal 134 from reader 130 in FIG. 1), there are a number of advantages to use of a frequency about 5 GHz (such as 5.8 GHz as discussed above). The use of higher frequencies allows for use of smaller reader and sensor tag antennas and also allows for smaller bend transducer structures. Further, though, higher frequencies are likely to provide higher sensitivities in detecting bend, and, hence, it may be useful to use microwave structures for the bend transducer to directly modulate a carrier wave in many applications.

We claim:

1. A system for sensing bending of a monitored object, comprising:
    a radio frequency (RF) reader transmitting a read signal and, in response, receiving a reflected signal; and
    a wireless bend sensor including an antenna, a chip electrically connected to the antenna, and a bend transducer electrically connected to the chip, wherein the antenna receives the read signal and reflects the reflected signal and wherein the reflected signal is modulated based on a bend radius of the bend transducer,
    wherein the RF reader further comprises a bend determination module determining a value of the bend radius based on a difference between the reflected signal when the wireless bend sensor is in an absorbing state and when the wireless bend sensor is in a reflecting state.

2. The system of claim 1, wherein the read signal has a frequency in the range of 5 to 5.8 GHz.

3. A system for sensing bending of a monitored object, comprising:
    a radio frequency (RF) reader transmitting a read signal and, in response, receiving a reflected signal; and
    a wireless bend sensor including an antenna, a chip electrically connected to the antenna, and a bend transducer electrically connected to the chip, wherein the antenna receives the read signal and reflects the reflected signal and wherein the reflected signal is modulated based on a bend radius of the bend transducer,
    wherein the bend transducer comprises a microwave structure coupled to the monitored object and being deformed with movement of the object to vary the bend radius.

4. The system of claim 3, wherein the read signal has a frequency in the range of 902 to 928 MHz, in the range of 2400 to 2483.5 MHz, or in the range of 5825 to 5850 MHz.

5. The system of claim 4, wherein the bend transducer comprises a transducer formed from liquid metals.

6. A system for sensing bending of a monitored object, comprising:
    a radio frequency (RF) reader transmitting a read signal and, in response, receiving a reflected signal; and
    a wireless bend sensor including an antenna, a chip electrically connected to the antenna, and a bend transducer electrically connected to the chip, wherein the antenna receives the read signal and reflects the reflected signal, wherein the reflected signal is modulated based on a bend radius of the bend transducer, wherein the bend transducer is configured to have differing impedances Corresponding to a plurality of values or the bend radius, wherein the RF reader comprises memory storing a set of values of the bend radius and, for each of the bend radius values in the set, a signal parameter, and wherein the RF reader comprises a bend determination module processing the reflected signal to determine a reflected signal parameter and to determine an amount of bend of the monitored object by comparing the determined parameter of the reflected signal with the stored signal parameters.

7. The system of claim 6, wherein the signal parameters comprise at least one of phase and amplitude.

8. A system for sensing bending of a monitored object, comprising:
a radio frequency (RF) reader transmitting a read signal and, in response, receiving a reflected signal; and
a wireless bend sensor including an antenna, a chip electrically connected to the antenna, and a bend transducer electrically connected to the chip, wherein the antenna receives the read signal and reflects the reflected signal and wherein the reflected signal is modulated based on a bend radius of the bend transducer,
wherein the bend transducer is linked to the chip to define a reflecting impedance of the chip, whereby the reflecting impedance of the chip varies with the bend radius of the bend transducer.

9. A system for sensing bending of a monitored object, comprising:
a radio frequency (RF) reader transmitting a read signal and, in response, receiving a reflected signal; and
a wireless bend sensor including an antenna, a chip electrically connected to the antenna, and a bend transducer electrically connected to the chip, wherein the antenna receives the read signal and reflects the reflected signal and wherein the reflected signal is modulated based on a bend radius of the bend transducer,
wherein the bend transducer is spaced a distance apart from the chip and the antenna, whereby the bend transducer is deformed independently from any deforming of the antenna.

10. A bend sensor, comprising:
an RF antenna;
an integrated circuit linked to the RF antenna, wherein the integrated circuit is semi-passive and, in response to a read signal received by the RF antenna, operates the RF antenna to transmit a reflected signal; and
a transducer linked to the integrated circuit to define a reflecting impedance of the integrated circuit defining amplitude and phase of the reflected signal,
wherein the transducer has an impendance varying with an amount of deformation of the transducer.

11. The bend sensor of claim 10, wherein the transducer comprises a passive tag with a charge pump connected in series to an absorbing impedance element or included in the absorbing impedance element.

12. The bend sensor of claim 10, wherein the transducer comprises a passive tag with a charge pump connected in parallel to both an absorbing impedance element and the reflecting impedance of the integrated circuit.

13. The bend sensor of claim 10, wherein the transducer comprises an upper conductor and the amount of the deformation is defined by a bend radius of the upper conductor.

14. The bend sensor of claim 10, wherein the transducer comprises a substrate that is planar in a non-deformed state and wherein the substrate is spaced apart from the integrated circuit, whereby the substrate is independently deformable relative to the integrated circuit and the antenna.

15. The bend sensor of claim 10, further comprising a switch switching impedance of the integrated circuit between an absorbing impedance and the reflecting impedance, whereby the reflected signal is alternately defined by the absorbing and reflecting impedances.

16. The bend sensor of claim 10, wherein the read signal is at a frequency greater than 5 GHz and the antenna and the transducer are microwave structures.

17. The bend sensor of claim 10, wherein the transducer comprises a transmission element comprising a planar strip of copper mounted on a flexible substrate made up of a dielectric layer and an electrically conductive ground layer.

18. A wireless bend sensing assembly, comprising:
an RFID tag comprising an antenna, a chip, and a transducer, wherein the transducer is connected to the chip to define reflecting impedance of the chip and wherein the transducer is adapted to have an input impedance varying with a bend radius of the transducer; and
an RF reader transmitting a read signal to the RFID tag and receiving a reflected signal from the antenna of the RFID tag, the reflected signal having parameters varying with changes in the bend radius of the transducer.

19. The assembly of claim 18, wherein the varying parameters include phase and amplitude.

20. The assembly of claim 18, wherein the transducer has differing input impedances corresponding to a plurality of values of the bend radius, wherein the RF reader accesses memory storing a set of the values of the bend radius and, for each of the bend radius values in the set, a signal parameter, and wherein the RF reader comprises a bend determination module processing the reflected signal to determine a reflected signal parameter and to determine an amount of bend of the transducer based on the determined parameter of the reflected signal and the stored signal parameters.

21. The assembly of claim 18, wherein the read signal is transmitted at a frequency of about 5.8 GHz.

22. The assembly of claim 18, wherein the transducer comprises a flexible substrate supporting a flexible microwave structure adapted to vary in impedance with changes to the bend radius and wherein the supporting substrate is spaced apart from the antenna, whereby the bend radius is varied free of deformation of the antenna.

* * * * *